Dec. 16, 1930.  S. S. MATTHES  1,785,522
CONNECTING DEVICE
Filed Nov. 28, 1925
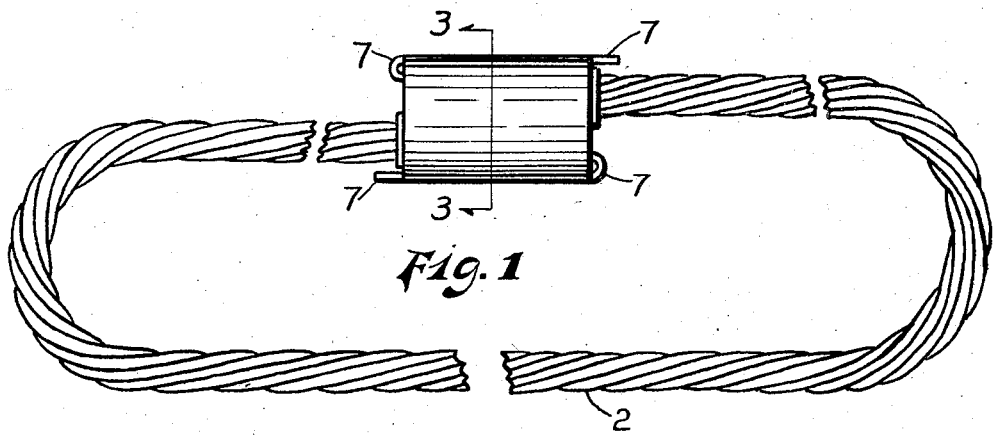
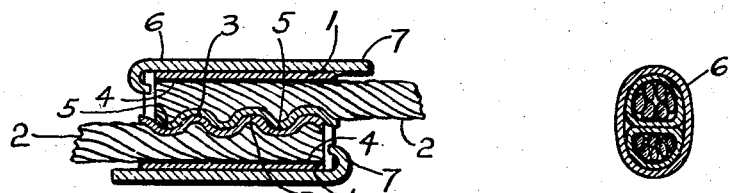
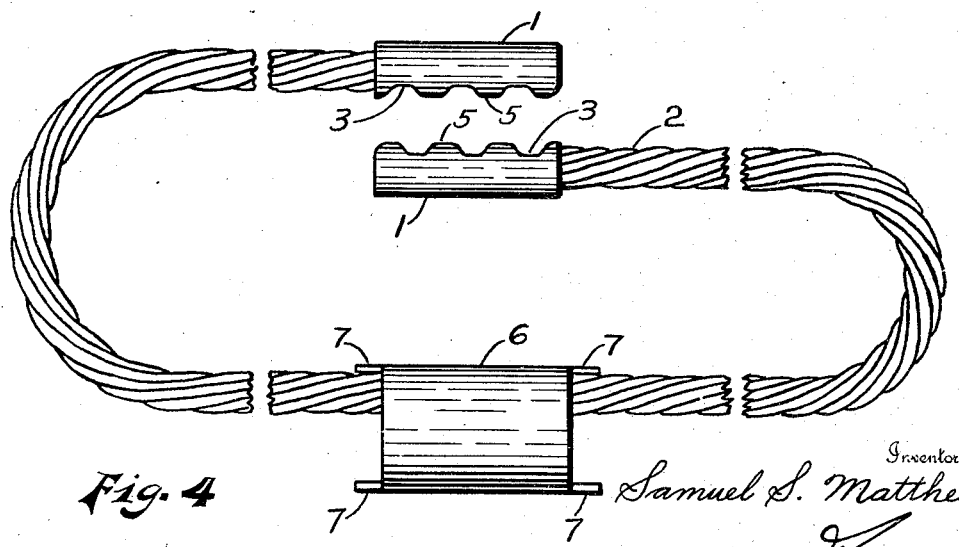
Inventor
Samuel S. Matthes
By
Attorney Patented Dec. 16, 1930

1,785,522

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

CONNECTING DEVICE

Application filed November 28, 1925. Serial No. 71,926.

My invention relates to means for connecting the ends of flexible cables, wires or rods. While it is primarily intended to mechanically unite the adjacent ends of a cable, wire or rod, it will also unite them electrically but not with a sufficient degree of efficiency to be recommended for that purpose only where small currents may be employed.

The object of my invention is to provide means to be secured to the adjacent ends of two cables, wires or rods, etc., to be united, which will be inexpensive, simple and which will permit the joints to be made and unmade at will.

My invention resides in the new and novel construction, combination and relation of the various parts hereinafter more fully described and disclosed in the drawing.

In the drawing:

Fig. 1 shows my invention as connecting the adjacent ends of a flexible cable to form a closed loop.

Fig. 2 is a longitudinal section of Fig. 1 taken on a plane cutting through the greatest diameter of the joint.

Fig. 3 is a sectional view of Fig. 1 taken on the line 3—3.

Fig. 4 shows Fig. 1 before the ends have been interlocked and the retaining sleeve slipped into position.

In the preferred embodiment of my invention I employ sleeve members 1 adapted to be secured to the ends of a cable, wire or rod, etc., which are to be united. This sleeve may originally be a seamless drawn tube of just sufficient size to slip over the end of the cable 2 or other article to be connected. After the sleeve has been positioned upon the end of the cable 2 the parts are then placed in a die and compressed thereby forming a substantially flat face in the parts which in turn is provided with depressions 3. These depressions interlock with the end of the cable 2 thereby forming a secure engagement with the cable.

Under some conditions I may braze the member 1 to the cable 2 or unite them by dipping the ends in molten zinc, tin, etc., and this uniting may be brought about either before or after the sleeve has been subjected to pressure.

In Fig. 2 I have shown the sleeve and cable united by a film of metal 4. Such a union produces a very substantial and permanent hold of the sleeve 1 upon the cable 2.

After two ends of the cable 2 have been provided with the sleeve 1, as described, it will then be found that the depressions 3 and raised portions 5 of one cable end will interlock with the raised portions and depressions respectively of the other sleeve, as shown in Fig. 2.

If the cable ends thus united are prevented from separating it will be evident that it will be quite impossible to move the cables longitudinally with respect to each other. I, therefore, provide a collar 6 of seamless material and of such a shape and size as to conform to the outside shape and size of the two sleeves 1 when brought into operative relation as in Fig. 2. The collar 6 is arranged to slip readily over the sleeves when united and being of a comparatively close fit the ends of the cables 2 cannot separate transversely and are, therefore, held securely against transverse or longitudinal separation. In order to maintain the collar 6 in position at each end of the collar I provide the bendable lugs 7 and after the collar has been positioned I bend over a lug 7 on each end of the sleeve which will engage with the end of the parts 1 or 2 if the collar tends to displacement thereby preventing the collar from moving in either direction and thus completing the joint.

If it is desired to disconnect the cables at any time it will then be necessary to rebend at least one of the lugs 7 to permit the collar to be slipped from its final position.

It will be evident that the arrangement shown is simple and effective and subject to modifications by those skilled in the art.

My invention is particularly applicable to forming a closed loop of flexible cable for connecting porcelain insulators together, but can be used for many other purposes as will be evident.

I claim:

1. A connection comprising a pair of adjacent cable ends to be connected, each cable end being composed of a plurality of members, a sleeve through which each cable end extends with the end face exposed and secured to each cable end and engaging each other throughout substantially their entire lengths and having transverse ribs interlocked with each other, an interposed film of metal united to the cable and sleeve to prevent the cable ends moving longitudinally relative to each other, each sleeve having its exposed side surface unbroken and a slidably mounted collar encircling the interlocked sleeves to prevent disengagement of the sleeves.

2. A connection comprising a pair of adjacent cable ends to be connected, a sleeve secured to each cable end and having transverse ribs interlocked with each other and an interposed film of metal to unite each sleeve to its cable end to prevent the cable ends moving longitudinally relative to each other and to said sleeve, a collar encircling the interlocked sleeves to prevent disengagement of the ribs and means on the ends of the collar to be bent inwardly to prevent the displacement of the collar.

3. A connector comprising a pair of tubular members each having one or more transverse ribs arranged along one outer flattened side interlocked with each other to prevent the members moving transversely to the ribs, and the balance of the outer surface being plain, each member adapted to receive an end of a cable to be connected, a collar slidably mounted upon the interlocked members to prevent relative longitudinal and transverse disengagement of the members and means on the collar and overhanging the members to prevent movement of the sleeves relative to each other and to the collar.

4. A connection comprising a pair of cable ends to be connected, an elongated sleeve secured to each cable end, the sleeves disposed parallel to each other and in contact along their sides, transverse ribs on each sleeve along their contacting sides and interlocked with each other to prevent relative longitudinal movement of the sleeves, transverse ribs projecting within each sleeve and interlocked with the cable therein preventing relative longitudinal movement of the cable and sleeves; a collar encircling the interlocked sleeves to prevent disengagement of the ribs and means at the ends of the collar to engage the sleeves to prevent displacement of the collar.

5. A connector comprising a pair of elongated tubular members each to receive the end of a cable, the members positioned side by side in parallel relation and contacting along one side, holding means along the contacting sides of said members and interlocking with each other to prevent relative longitudinal movement, a locking member slidably mounted on the tubular members to hold the members in engagement with each other and the holding means on the members interlocked, and projecting bendable means at the ends of one of the members to be bent-over to engage one of the other members to prevent displacement of the locking member.

In testimony whereof I affix my signature.
SAMUEL S. MATTHES.